United States Patent Office 3,472,830
Patented Oct. 14, 1969

---

3,472,830
POLYMERIZATION OF UNCONJUGATED ALKADIENES INTO LINEAR POLYMERS
Warren Nesmith Baxter and Ivan Maxwell Robinson, Wilmington, Del., assignors to E. I. du Pont de Nemours and Company, Wilmington, Del., a corporation of Delaware
No Drawing. Continuation-in-part of application Ser. No. 470,501, Nov. 22, 1954. This application May 27, 1958, Ser. No. 738,048
Int. Cl. C08f 3/02, 1/32
U.S. Cl. 260—94.2     3 Claims

ABSTRACT OF THE DISCLOSURE

Polymerizing a monomer of the formula $H_2C=CH-R-CH=CH_2$ with a coordination catalyst to form a homopolymer composed of repeating units having the general structure

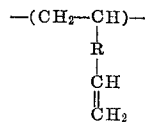

wherein R is a hydrocarbon group of 1 to 14 carbon atoms.

---

This invention relates to the preparation of novel polymers of unconjugated alkadienes.

This is a continuation-in-part application of patent application Ser. No. 470,501 filed on Nov. 22, 1954, by W. N. Baxter and I. M. Robinson, now abandoned.

Polymers have been prepared heretofore from conjugated dienes, but no art is known for the preparation of linear polymers from unconjugated alkadienes. A novel process has now been discovered for the preparation of linear polymers of unconjugated alkadienes, such as 1,5-hexadiene and the like.

It is an object of this invention to provide a process for polymerizing unconjugated alkadienes into novel compositions of matter. From the following description, other objects will become apparent to those skilled in the art.

The above objects are accomplished in accordance with the processes of this invention by subjecting an unconjugated alkadiene hydrocarbon to polymerization conditions in the presence of a coordination catalyst as described hereinbelow.

The following example illustrates the processes and products of this invention. Parts and percentages are by weight unless otherwise specified. Inherent viscosity as used herein is defined as $$\frac{\ln \text{relative viscosity}}{C}$$

where relative viscosity is the ratio of the solution viscosity to the solvent viscosity and C is the concentration in grams of solute per 100 ml. of solvent, the concentration employed in the following examples being from 0.1–0.5 gram of polymer solids in 100 ml. of the indicated solvent.

EXAMPLE 1

A catalyst mixture was prepared consisting of 0.005 mole of titanium tetrachloride and 20 ml. of a solution of lithium aluminum tetrabutyl in cyclohexane. This mixture was add to 100 ml. of cyclohexane in a vessel equipped with a stirrer and a reflux condenser. While the mixture in the vessel was stirred, 6 grams of 1,5-hexadiene dissolved in 25 ml. of cyclohexane was added over a period of 15 minutes. After stirring the contents of the vessel for 1 hour, 1 liter of methanol was added causing a sticky, rubbery solid to precipitate. The precipitate was washed successively with methanol, methanol-sodium hydroxide, water, and acetone. After drying, there was recovered 5 grams of poly(1,5-hexadiene) as a white rubbery solid. Films pressed from this polymer were rubbery and tough. Infrared analysis on this polymer showed about 75% vinyl unsaturation and about 25% trans-unsaturation. The polymer was soluble in xylene, had a density of 0.93, a stick temperature of 200° C., and exhibited an inherent viscosity of 1.4 (measured on a solution of 0.1 gram of polymer in 100 ml. of decahydronaphthalene at 125° C.).

EXAMPLE 2

Heptadiene-1,6 is prepared by the sodium-ammonium sulfate reduction of heptadiene-1,6 in liquid ammonia according to the procedure of Greenler, J. Am. Chem. Soc., 67, 484 (1945) and 65, 2020 (1943).

In a 100 ml. flask that has been flamed under argon and which contains an atmosphere of this gas is added 12 ml. of dry decahydronaphthalene and then with stirring 1.2 ml. of 0.001 molar solution of titanium tetrachloride in decahydronaphthalene, followed by 2 ml. of a freshly prepared 0.001 molar solution of aluminum triisobutyl in decahydronaphthalene. A dark, brownish-black precipitate forms. The reaction mixture is stirred for 5 minutes at room temperature and then 2.1 grams of heptadiene-1,6 added. Stirring is continued for 20 hours at room temperature. Addition of ethanol to the reaction mixture precipitates a rubbery solid. This polymer is triturated with ethanol repeatedly to produce a white rubbery polymer, which is dissolved in 50 ml. of benzene and centrifuged. The clear, viscous supernatant liquid is deccanted into excess ethanol to precipitate the polymer which is twice more dissolved, centrifuged and reprecipitated and then dried at 50° in a vacuum oven. There is obtained 1.15 grams of a colorless, tough solid which is readily soluble in benzene, chloroform, and cyclohexane and has an inherent viscosity in toluene of 0.51. The polymer has a melt temperature of 140–150° C. and can be pressure-molded into tough, clear, flexible films. Infrared spectroscopy shows the polymer to contain not more than one vinyl group per 30–40 monomer units and not more than one vinylidene group per 20 monomer units and to have a spectrum similar to that of 1,3-(cyclohexylmethyl) cyclohexane.

It is understood that the foregoing example is illustrative, and that this invention is intended to encompass other unconjugated alkadiene polymers and processes for preparing them.

The monomers included within the scope of the process of this invention are the alpha, omega alkadienes having 5–18 carbon atoms per molecule. These compounds are of the straight-chain type and have the general formula:

$$H_2C=CH-R-CH=CH_2$$

where R is a hydrocarbon group containing 1–14 carbon atoms. Preferably, R is a methylene or a chain of methylene groups, e.g. $(CH_2)_n$ where $n$ is an integer from 1-14. R, however, may take an isomeric form where there are substituent groups or side chains of hydrocarbons on the central methylene chain. For example R may be

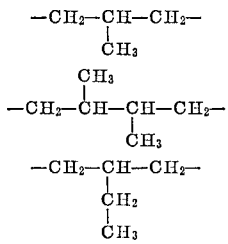

or the like.

Specific compounds falling within the above description of the monomer are 1,4-pentadiene; 1,5-hexadiene; 1,6-heptadiene; 1,7-octadiene; 1,8-nonadiene; 1,9-decadiene; 1,10-hendecadiene; 1,11-dodecadiene; 1,12-tridecadiene; 1,13-tetradecadiene; 1,14-pentadecadiene; 1,15-hexadecadiene; 1,16-heptadecadiene; 1,17-octadecadiene; 1,6-heptadiene, 4-methyl; 1,7-octadiene, 4,5-dimethyl; 1,6-heptadiene, 4-ethyl; and the like.

The polymeric products of this invention are polyalkadienes having an inherent viscosity of at least 0.3 measured at 125° C. on a solution of 0.1 gram of polymer solids in 100 ml. of decahydronaphthalene. The polymer, because of the diolefinic nature of the monomer, may take any of several forms. There may be vinyl groups in side chains; there may be unsaturation in the polymer chain; and there may, in some instances, be cyclic structures formed in the polymer chain. For example, 1,5-hexadiene may polymerize with some vinyl unsaturation:

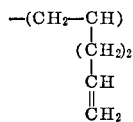

or it may polymerize to produce some trans-unsaturation:

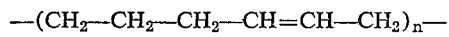

or it may polymerize to produce a cyclic structure:

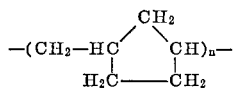

It is intended that this invention include the polymers of alkadienes regardless of which of the three above forms the polymer may take. Normally, there will be some of each of the above forms in any polymer of these alkadienes, with the single exception that the cyclic form will normally not be present in polymers of pentadiene and polymers of octadiene and higher homologues. In the case of hexadiene a fine-membered ring is formed, and in the case of heptadiene a six-membered ring is formed. It is, of course, possible to form a four-membered ring from pentadiene and a seven-membered ring from octadiene, but their occurrence is rare.

The term "coordination catalyst" wherever used in this description and in the appended claims is defined as a catalyst formed by the reaction of a polyvalent metal compound, specifically defined below, with a reducing agent, also specifically defined below, the reducing agent being present in sufficient amount to reduce the valence state of said polyvalent metal, at least in part, to less than 3.

It is preferable to provide enough reducing agent to reduce the valence of all of the polyvalent metal to 2 or less. The polyvalent metal compounds are the halides and esters of the elemental polyvalent metals from the group consisting of Ti, Zr, Ce, V, Nb, Ta, Cr, Mo, and W. The polyvalent metal esters are those having the formula $M_n(OR)_m$ where M is the elemental polyvalent metal, O is oxygen, R is a monovalent hydrocarbon radical or a monovalent substituted hydrocarbon radical, and $n$ and $m$ are intergers. The reducing agent in the above definition may be any substance capable of reducing the above polyvalent metal compounds, e.g. metals, metal hydrides, and organometallic compounds. The preferred reducing agent is an organometallic compound having at least one metal-to-hydrocarbon bond.

Specific examples of the polyvalent metal halides and esters included in the above definition are titanium tetrachloride, titanium tetrafluoride, zirconium tetrachloride, niobium pentachloride, vanadium tetrachloride, vanadyl trichloride, tantalum pentabromide, cerium trichloride, molybdenum pentachloride, tungsten hexachloride, tetra-(2-ethyl hexyl)-titanate, tetrapropyl titanate, titanium oleate, actylene glycol titanate, triethanolamine titanate, tetraethyl zirconate, tetra(chloroethyl) zirconate, and the like.

Specific examples of the preferred reducing agents included in the above definition are phenyl magnesium bromide, lithium aluminum tetraalkyl, dimethyl cadmium, and the like.

The exact composition of the "coordination catalyst" when it is in its active state, capable of polymerizing ethylenically unsaturated compounds is not known. However, it is known that when one of these polyvalent metal compounds is mixed with a sufficient amount of an organometallic reducing agent, such as lithium aluminum tetraalkyl, to reduce the valence of the polyvalent metal to less tha 3, and preferably to 2, the polyvalent metal composition becomes a highly active polymerization catalyst. In this highly active state the polyvalent metal composition is capable of forming coordination complexes with ethylenically unsaturated monomers causing them to polymerize to a high malecular weight linear polymer.

The reaction conditions of the polymerization process are extremely mild. Pressures of 1 to 200 atmospheres are normally employed. Temperatures of 0° to 300° C. are preferred. The most satisfactory results are obtained when the polymerization medium is free of moisture or other sources of hydroxyl groups, free of oxygen, and free of ketones, esters, or aldehydes.

The polymers of this invention which contain residual unsaturation are capable of being cross-linked by heating, by treatment with acid catalysts, or by treatment with known free-radical catalysts. The polymers of this invention are thermoplastic before being cross-linked, and therefore may be molded into films, spun into fibers and filaments, cured to elastomeric materials, or used in coating compositions. These polymers may also be vulcanized with S or $SO_2$ and suitable catalyst according to methods known in the art of rubber chemistry. The polymers of this invention may be high or low in molecular weight, although generally, those with a degree of polymerization of 5 or less are not preferred. The cross-linked polymer products are insoluble materials, which do not melt like thermoplastic materials, and, accordingly are useful in many applications such as molding, coating, and the like. The polymers which polymerize to form cyclic structures in the polymer chain, as described hereinabove, do not have residual unsaturation, and, accordingly, are not subject to the cross-linking treatment just mentioned.

We claim:
1. A linear thermoplastic homopolymer of an unsubstituted unconjugated alpha, omega-alkadiene monomer of the formula $H_2C=CH-R-CH=CH_2$, said homopolymer having a melting point above 140° C. and having a degree of polymerization greater than 5, the major portion of said homopolymer being composed of units having the general structures:

$$-(CH_2-CH)-\underset{\underset{CH_2}{\overset{\|}{CH}}}{\overset{|}{R}}$$

wherein R in both formulae is a hydrocarbon group containing 1 to 14 carbon atoms.

2. A linear, thermoplastic homopolymer of 1,5-hexadiene, said polymer having a stick temperature of about 200° C. and having a degree of polymerization greater than 5, the major portion of said polymer having the general structure:

$$-(CH_2-CH)-\underset{\underset{CH_2}{\overset{\|}{CH}}}{\overset{|}{(CH_2)_2}}$$

3. A process for preparing a linear thermoplastic homopolymer having a melting point above 140° C. and having a degree of polymerization greater than 5, the major portion of said homopolymer being composed of units having the general structure $$-(CH_2-CH)-\underset{\underset{CH_2}{\overset{\|}{CH}}}{\overset{|}{R}}$$

said process comprising subjecting a monomer of the formula $H_2C=CH-R-CH=CH_2$ to polymerization conditions of 1 to 200 atmospheres and 0–300° C. in the presence of a mixture of a polyvalent metal compound from the group consisting of the halides and esters of titanium, zirconium, cerium, vanadium, niobium, tantalum, chromium, molybdenum, and tungsten and a sufficient amount of an organometallic compound having at least one metal-to-hydrocarbon bond to reduce the valence of said polyvalent metal to two, and recovering the homopolymer; R in both formulae being a hydrocarbon group containing 1 to 14 carbon atoms.

References Cited

UNITED STATES PATENTS

| | | | |
|---|---|---|---|
| 2,457,306 | 12/1948 | Dreyfus | 260—94.2 |
| 2,612,493 | 9/1952 | Sparks et al. | 260—94.2 |
| 2,721,189 | 10/1955 | Anderson et al. | 260—94.9 |
| 2,881,156 | 4/1959 | Pilar et al. | 260—94.9 |
| 2,908,674 | 10/1959 | Nowlin et al. | 260—94.9 |
| 2,910,461 | 10/1959 | Nowlin et al. | 260—94.2 X |
| 2,923,702 | 2/1960 | Lyons | 260—94.9 |
| 2,905,645 | 9/1959 | Anderson et al. | 260—94.9 |
| 2,962,488 | 11/1960 | Horne | 260—94.3 |
| 3,044,986 | 7/1962 | Butler | 260—94.3 |

FOREIGN PATENTS 549,009   10/1956   Italy.

OTHER REFERENCES

Hatch: Petroleum Refiner, vol. 36, No. 4, April 1957, pages 169–171.

Marvel et al.: "Journal of American Chemical Society," pages 1740–44, vol. 80, Apr. 5, 1958.

HARRY WONG, JR., Primary Examiner